A. H. EMERY.
RAILROAD TRACK SCALE.
APPLICATION FILED DEC. 31, 1915.

1,222,271.

Patented Apr. 10, 1917.
5 SHEETS—SHEET 1.

Inventor
Albert H. Emery,

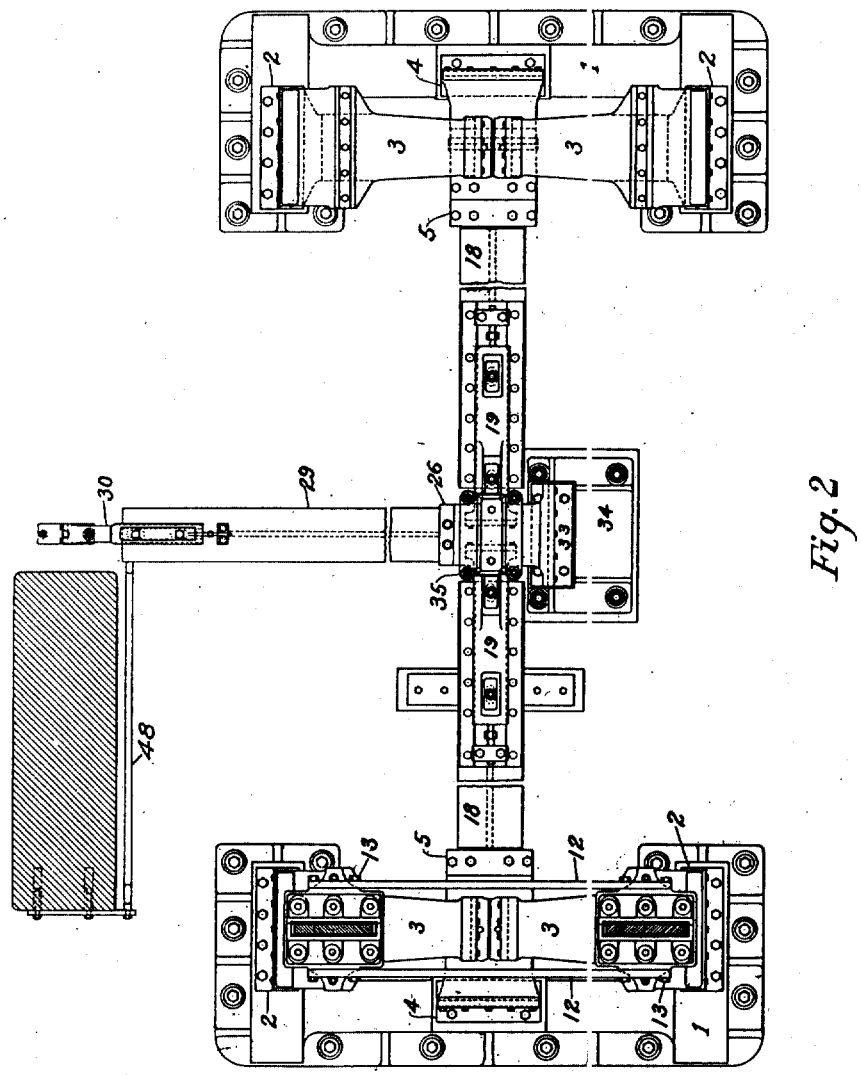

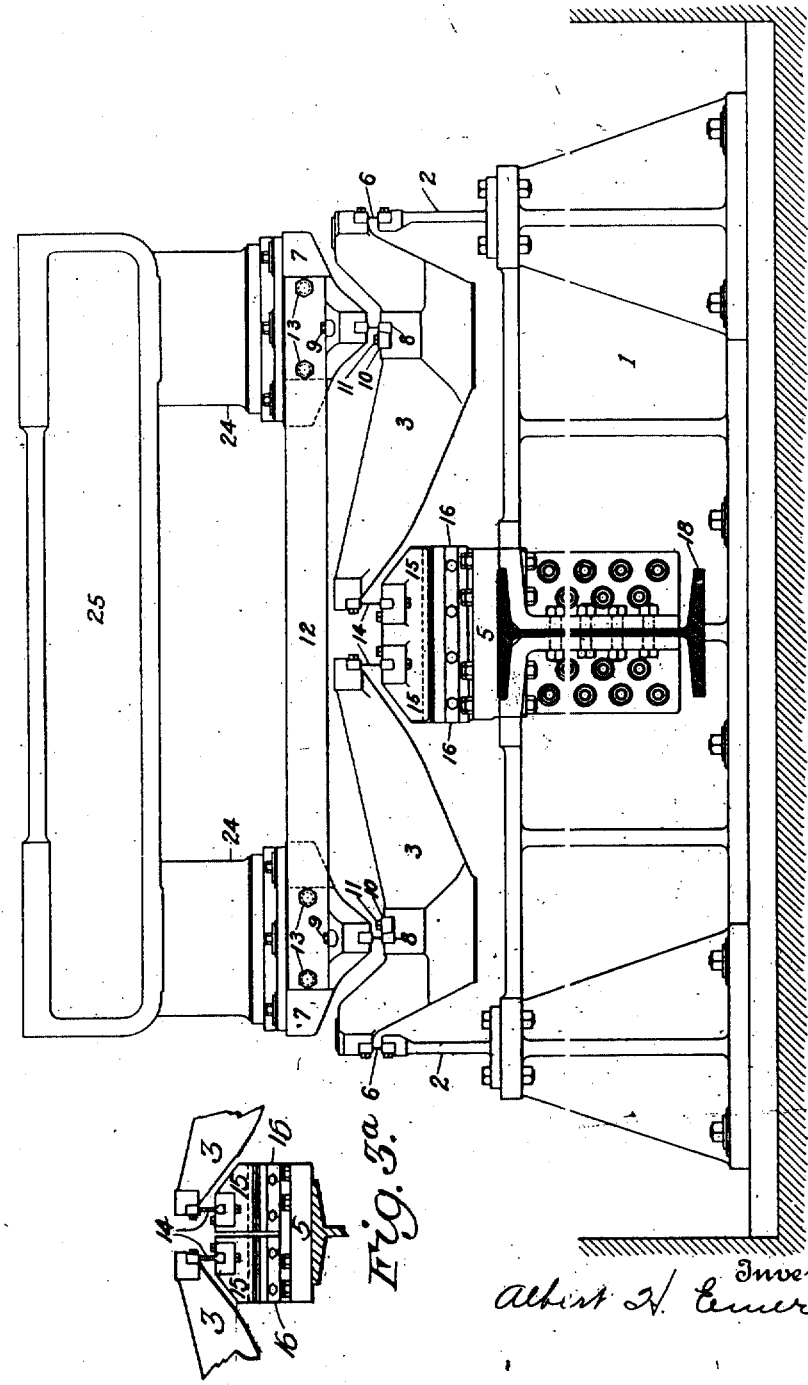

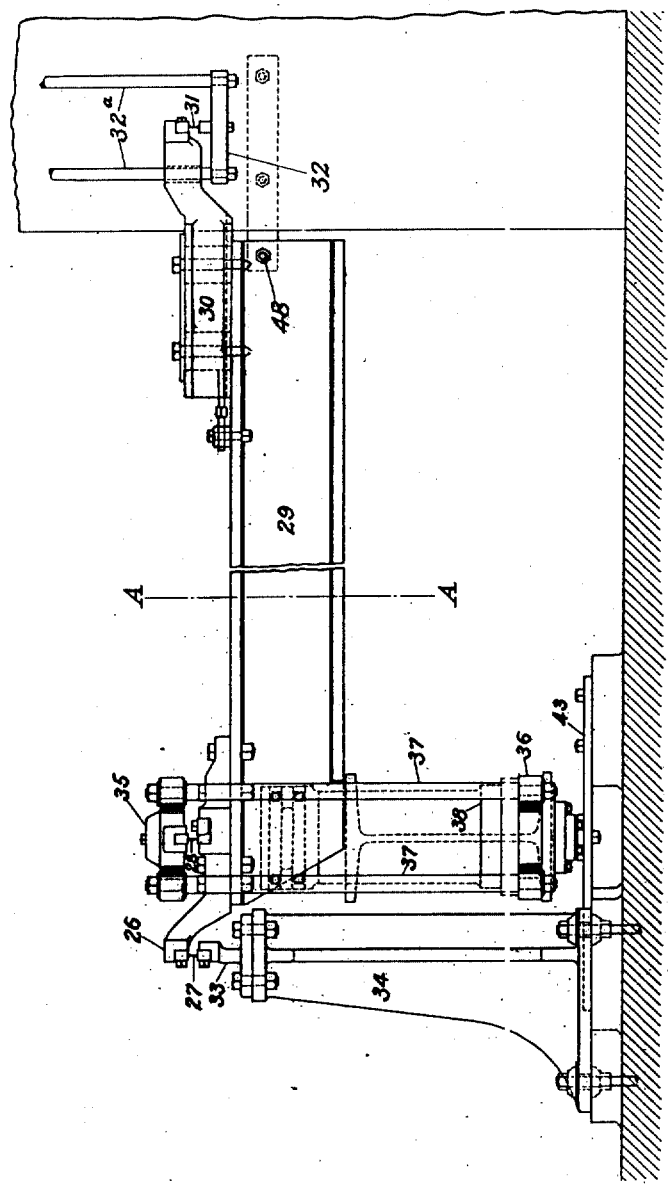

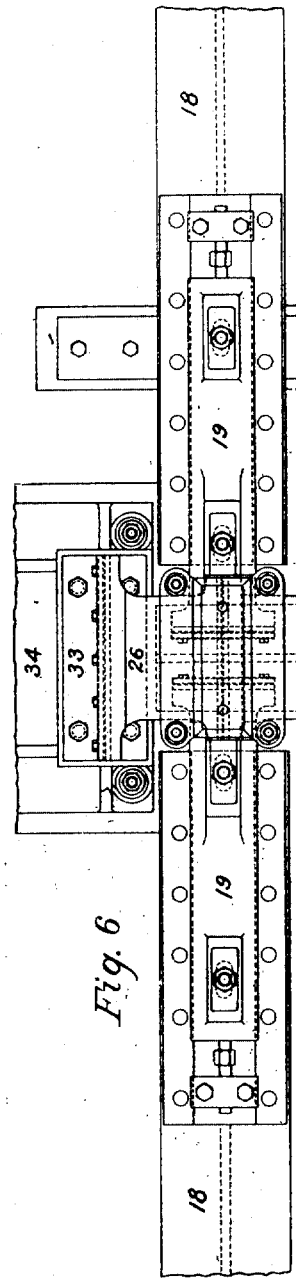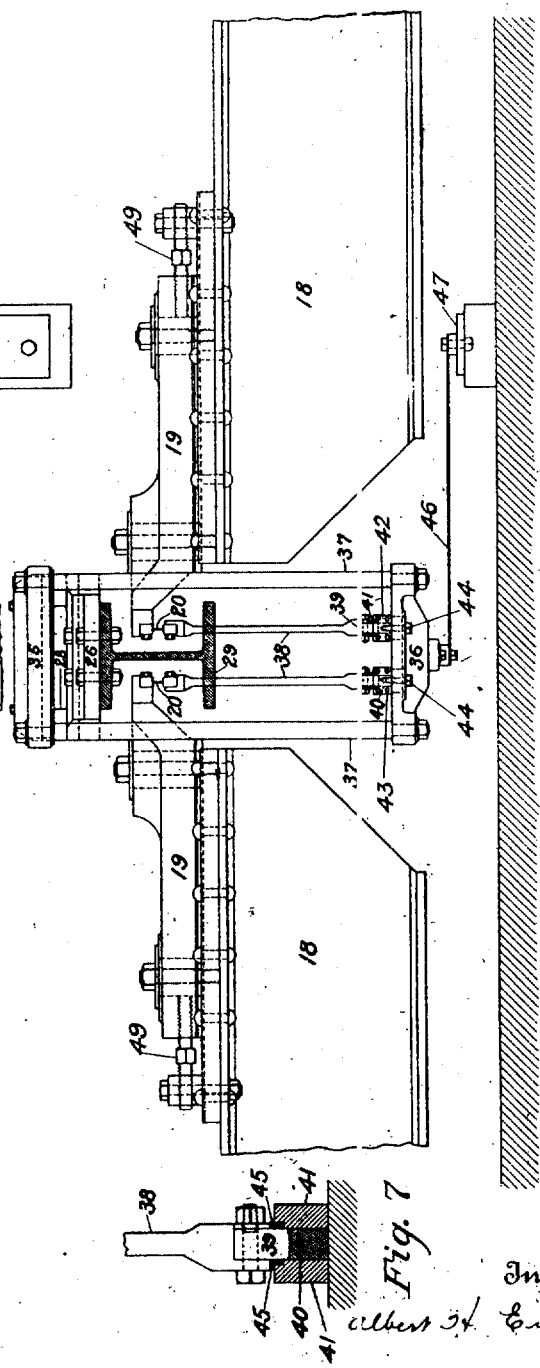

UNITED STATES PATENT OFFICE.

ALBERT HAMILTON EMERY, OF STAMFORD, CONNECTICUT.

RAILROAD TRACK-SCALE.

1,222,271.  Specification of Letters Patent.  Patented Apr. 10, 1917.

Application filed December 31, 1915. Serial No. 69,665.

*To all whom it may concern:*

Be it known that I, ALBERT H. EMERY, a citizen of the United States, residing at Stamford, in the county of Fairfield and State of Connecticut, have invented certain new and useful Improvements in Railroad Track-Scales, of which the following is a specification.

My invention relates to scales in which the load is transmitted, by a platform, to two or more pairs of levers which transmit a portion thereof to second levers or extension levers, which in turn transmit a portion of their load to a third or transverse extension lever, which transmits a portion of its load to a scale beam or other indicating apparatus, all the levers using plate fulcrums for transmitting their loads.

My invention is illustrated in the accompanying drawings in which:—

Fig. 2 shows a plan of the scale with the bridge removed;

Fig. 3 shows a transverse section of the scale taken between the end levers or first levers and the transverse extension lever or third lever, the bridge being removed;

Figure 1:
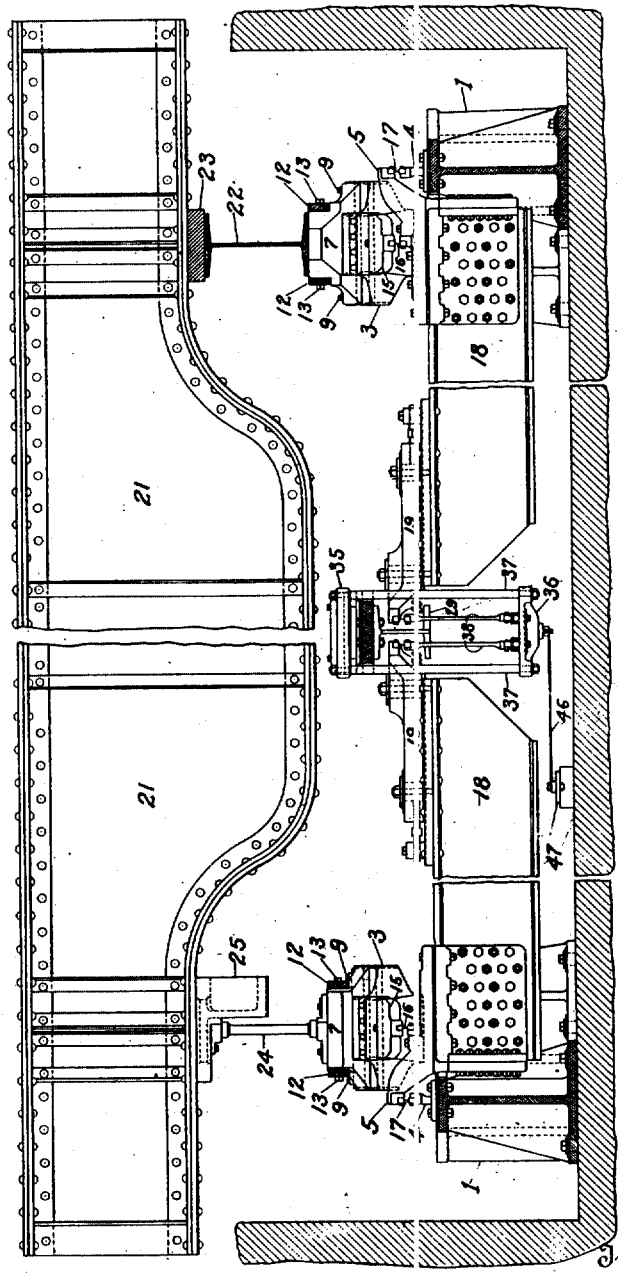
Figure 1 shows a longitudinal section of the scale and bridge.

Fig. 3ª shows an alternative construction of the loading blocks for the second levers where a loading block is provided for each first lever;

Fig. 4 shows a side elevation of the transverse extension lever or third lever;

Fig. 5 shows a section of the third lever taken on the line A—A; Fig. 4, and shows the ends of the longitudinal extension levers or second levers and the method of transmitting the load from them to the transverse extension lever or third lever;

Fig. 6 shows a plan of that part of the scale shown in Fig. 5;

Fig. 7 shows a detail, on a larger scale, of some of the parts transmitting the load from the second to the third lever, also shown in Fig. 5.

My invention will be more fully understood from the following detailed description of the drawings, in which the same numerals, in the various figures, refer to the same parts.

In general the term "fulcrum" in connection with a lever, means that upon which the lever turns. But in all of my specifications, of structures in which I have used plate fulcrums, I have given the term a more general meaning.

Thus in this application each of the seven levers shown has three bearings, or points of action, which are supplied with what I have always called "plate-fulcrums." They are centers of action similar to fulcruming action in many respects.

Each of the three fulcrums, for each of these levers, is secured to its lever and each receives, continually, a load of compression.

In this application each of the seven levers shown, is supported by the fulcrums secured to its ends, one of which is called the fixed supporting fulcrum, about which it turns, and the other the transmitting fulcrum, which transmits a constant and definite portion of the load put on this lever by the loading fulcrum.

1 represents two beds set transversely, one near each end of the scale, bolted to a suitable scale foundation, and each carrying two fulcrum-chairs 2, for the first levers 3, and one fulcrum-chair 4, for the end 5 of the second or longitudinal extension lever.

Each of the first levers 3 is supported on and fixed to its chair 2, by a plate-fulcrum 6 securely bolted to both chair and lever and each first lever receives its load from a loading block 7 through a plate-fulcrum 8 which is shown secured to the block 7 by screw 9 which holds one of its enlarged rectangular ends firmly in a rectangular recess which it fits very closely. Or the said end may be forced into this seat if desired. The other end of the fulcrum 8 is shown held in place by a wedge piece 10 which is forced to place by screws 11.

To keep the blocks 7 from tipping they are secured to each other by bars 12 and bolts 13.

The plate-fulcrums 14 at the long or inner ends of levers 3 are made with a relatively long central portion and are securely fastened to both the levers 3 and loading block 15, which transmits its load through a fulcrum 16 to the piece 5. For ease of manufacture and to allow for inaccuracies in workmanship, it is sometimes preferred to cut the block 15 into two separate blocks and to cut the fulcrum 16 also as is shown in Fig. 3ª.

It would be possible to dispense with the loading block 15 entirely and have the fulcrums 14 rest on and be fastened directly to the fulcrums 16 or even to make the fulcrums 14 and 16 in a single piece.

The second or transverse extension lever may be made of a single casting or forging provided at the long end with an adjustable piece commonly called a "nose-iron," but on account of its length, I prefer to make it in the form shown, in which a head 5 is securely fastened to the main body 18. The head 5 has securely fastened thereto the loading fulcrum 16 and supporting fulcrum 17. The main body 18 is preferably formed of a rolled or riveted up section which carries also an adjustable piece or "nose-iron" 19 to which is securely fastened the fulcrum 20.

The drawings show a scale having two pairs of first levers, commonly spoken of as two sections, one near each end of the scale-platform or bridge, with the second levers 18 extending toward each other and nearly meeting at the center of the scale.

The scale-platform or bridge 21 is shown carried on the first lever loading blocks 7 through a rolled I- or girder-beam 22 and block 23 on one section, and on two rolling supports 24 and transverse beam or bridge support 25 on the other section. These will be more fully described and claimed in another application.

The third or transverse extension lever (see Figs. 4, 5 and 6) may be made of a single casting or forging, but I prefer to make it of the form shown which consists of a head 26 which has fastened to it the supporting or fixed fulcrum 27 and the loading fulcrum 28, this head being securely fastened to the main body of the lever 29, here shown of a rolled H section, this extension portion carrying an adjustable end piece or "nose-iron" 30 to which is fixed the fulcrum 31. The load from this fulcrum 31 is transmitted to a weigh beam, or any other suitable weighing apparatus, through the cross-beam 32 and rods 32ª.

The third lever fulcrum 27 is fixed to a chair 33 which is bolted to a foundation pedestal 34, securely bolted to the foundation of the scale.

The load might be transmitted from the end fulcrums 20 of the second levers to the loading block 35 and fulcrum 28 of the third lever 29 which would require this lever 29 and its loading block and fulcrum 28 to set below the fulcrums 20 of the second levers, but I prefer the construction shown which consists of a loading block 35 fixed to the loading fulcrum 28 of the third lever and a secondary or suspended platform 36 secured to block 35 by rods 37, the loads being transmitted from the fulcrums 20 to this block by rocking supports 38 which are secured at one end to fulcrums 20 and have hardened insets 39 at the other end, these insets rocking on hardened platforms 40 which are adjustably fastened to block 36. See Fig. 7.

Platforms 40 are kept in place by the side housing pieces 41 and end housing pieces 42, secured to 41 by screws 43 and to the block 36 by the screws 44 screwed into platforms 40 and working in slots in block 36 to secure platform 40 in its place, when adjusting the length of the second levers 18. 45 are pieces of felt or other suitable material saturated with thick grease or other suitable material to keep dirt and water out of the space between 39 and 40. This space should be filled with thick grease.

The transmitting fulcrums 20, of the second levers, are secured to their nose-irons 19 which are adjusted in position by the right and left hand screws 49.

When the fulcrums 20 are moved to the right or left by the use of the screws 49, the rocking supports 38 are moved from their vertical position, and the blocks 40 should be moved to make 38 again vertical and then secured there by the use of screws 44.

A stay-bar or plate 46 is fastened to the suspended block 36 and to a bar 47 rigidly secured to the foundation. This stay-plate keeps the block from swinging under unequal loads from the two second levers.

A horizontal stay-bar 48 is fastened to the third lever and to the masonry, to keep the lever from horizontal swaying. This bar is very stiff longitudinally, but easily flexed vertically. The vertical deflections of both this stay and of stay 46 are small and purely elastic and do not affect the weighing of the scale if set level when the scale is properly adjusted.

The action of this construction is as follows:

When a load is placed upon the scale-platform or bridge, this load is all carried to the first-lever loading-blocks, by the beams 22 and 25 and the rolling supports 24. The loading blocks 7 transmit all the load to be weighed through their fulcrums 8 to the first levers and a definite proportion of this load is carried by the fulcrum 14 to the loading platforms 15 of the second levers.

Temperature changes will cause some changes of length in the bed 1 and levers 3, and to allow these changes to take place without putting injurious stresses in the fulcrums of the levers 3, the chairs 2 are made high and thin so they will flex easily under a small horizontal transverse load. Fulcrums 14 have their thin portions relatively long for the same reason.

Temperature changes also affect the length of the beams 18 and the rocking supports 38 allow this to take place without producing longitudinal stresses in the second lever fulcrums which would change the balance of the scale and cause incorrect weighings.

The loads from the transmitting fulcrums 20 are transmitted through the blocks 35 and 36 and rods 37 to the loading fulcrums 28 of the third lever.

I claim:—

1. In a scale, a bed, a pair of levers placed end to end in one plane, a chair for each of said levers, a plate fulcrum securely attached to each of said levers and to its chair, a loading block for each lever, a plate fulcrum securely attached to each of said levers and its loading block, a second lever, a loading block for said second lever, a plate fulcrum securely attached to said second lever and its loading block and two plate fulcrums securely attached to said loading block of said second lever and to the inner ends of said pair of levers.

2. In a plate-fulcrum scale, a lever and three plate-fulcrums securely attached thereto, the fulcrum at the end of the longer arm of the lever having its flexible part much longer proportionally than the others, so that the flection due to changes of length of the lever, caused by temperature changes, will not injure said fulcrum.

3. In a plate-fulcrum scale, a pair of levers placed end to end in one plane, a second lever placed at right angles thereto, a loading block for said second lever, a plate fulcrum securely attaching said loading block and lever and a pair of plate fulcrums securely attached to said loading block and to the inner ends of said pair of levers and means whereby said fulcrums are connected to said loading block and to said levers.

4. In a scale, a pair of levers, a second lever at right angles to said pair of levers, a loading block between said pair of levers and said second lever and plate-fulcrums connecting said loading block to said pair of levers and to said second lever.

5. In a scale, a bed, a pair of levers, a loading block for each lever, a plate fulcrum securing each of said loading blocks to its own lever, a bar rigidly fastened to these two loading blocks to keep them from tipping, and a pair of chairs which support these levers at their fixed points, said chairs being rigidly secured to said bed, and a plate fulcrum securely attaching each of said chairs to its respective lever.

6. In a scale, a pair of first levers, placed at right angles to the main axis of the scale, fixed plate-fulcrums supporting the outer ends of said levers, a second lever at right angles to said first levers, a loading block for said second lever, a plate-fulcrum securing said block to said second lever and plate-fulcrums fixed to the inner ends of said pair of levers transmitting their loads to said loading block.

7. In a scale, a pair of first levers, a bed supporting said levers, plate-fulcrums securing said levers to said bed, a second lever at right angles to said levers, a loading block for said second lever, a plate-fulcrum securing said block to said second lever, and plate-fulcrums fixed to the inner ends of said pair of levers and resting on said loading block.

8. In a scale, a pair of first levers, fixed plate-fulcrums at the outer ends of said levers, a scale-bed to which said plate-fulcrums are secured, a second lever at right angles to said pair of levers, a loading block for said second lever and plate-fulcrums securing said block to said second lever, and to the inner ends of each of said pair of levers.

9. In a track scale, a bed near each end of the scale, two pairs of first levers, plate-fulcrums securing said levers to said beds, two second levers, two loading blocks therefor, plate-fulcrums connecting said loading blocks to their second levers, and fulcrums secured to the ends of said first levers and resting on said loading blocks.

10. In a plate-fulcrum scale, two parallel pairs of first levers which receive their loads from the platform of the scale, two second levers at right angles to the first levers, each second lever receiving its load from one pair of said first levers, plate-fulcrums fixed to the inner ends of said second levers and a single loading block on which said plate-fulcrums rest.

11. In a scale, a lever, a loading block therefor, a plate fulcrum securing said lever to said loading block, a loading lever, a load-transmitting plate-fulcrum secured to the end of said loading lever and a rocking bearing between said load-transmitting plate-fulcrum and said loading block.

12. In a scale, a lever, a loading block therefor, a plate-fulcrum securing said lever to said block, a pair of loading levers, plate-fulcrums secured to said loading levers and rocking bearings between these fulcrums and said loading block on which they rest.

13. In a scale, a pair of levers, a third lever placed at right angles to said levers, a loading block and a plate-fulcrum securely attached to said loading block and said third lever, a secondary platform suspended from said loading block, plate-fulcrums secured to the inner ends of said pair of levers and rocking bearings between said fulcrums and said secondary block.

14. In a scale, a lever, a loading block therefor, a plate-fulcrum securing said block to said lever, a secondary block suspended from said block, a pair of primary levers, and plate-fulcrums secured to said primary levers and transmitting their loads to said secondary block.

15. In a scale, a lever, a loading block, a plate-fulcrum connecting said lever and loading block, a secondary block suspended from said loading block, a primary lever, a plate-fulcrum secured to said primary lever and transmitting loads to said secondary block, and a rocking bearing between said fulcrum and block.

16. In a scale, a lever, a loading block therefor, a plate-fulcrum connecting said lever and block, a secondary block suspended from said block and a horizontal stay secured at one end to said suspended block and at the other end to some fixed part of the scale or its foundation.

17. In a scale, a lever, a loading block therefor, a plate-fulcrum securing said block to said lever, a secondary block suspended from said block, a pair of primary levers, plate-fulcrums secured to said primary levers and rocking bearings between these fulcrums and said secondary block.

18. In a scale, a lever, a loading block therefor, a plate-fulcrum securing said block to said lever, a secondary block suspended from said block, a pair of primary levers, plate-fulcrums secured to said levers and transmitting loads to said secondary block and a horizontal stay suitably fixed at one end and secured at the other to the said suspended block to prevent its swaying under the unequal loading it receives from the said primary levers.

19. In a plate-fulcrum scale, a primary lever, a secondary lever, a loading block, a plate-fulcrum securing said block and secondary lever, a plate-fulcrum secured to said primary lever and a segment of a rocker attached to the lower end of said primary lever fulcrum and transmitting loads from said fulcrum to said block.

20. In a plate-fulcrum scale, a lever, an adjustable nose-iron suitably secured to said lever, a plate-fulcrum secured to said nose-iron, a second lever, a loading block therefor, a plate-fulcrum connecting said second lever and block and a rocking bearing between said nose-iron fulcrum and loading block.

21. In a plate-fulcrum scale, a lever head, two plate-fulcrums suitably secured thereto, a supporting chair secured to one of said fulcrums, a long rolled member suitably secured to said head, a transmitting plate-fulcrum and suitable means securing said transmitting plate fulcrum to said rolled member.

22. In a plate-fulcrum scale, a lever head, two plate-fulcrums suitably secured thereto, a supporting chair secured to one of said fulcrums, a long rolled member suitably secured to said head, a nose-iron adjustably secured to said rolled member and a plate-fulcrum secured to said nose-iron.

23. In a scale, two levers in sequence, plate-fulcrums supporting each lever, a loading block for each lever, plate-fulcrums securing each loading block to its lever and a transmitting plate-fulcrum connecting one lever to the loading block of the other lever.

24. In a scale, two levers in sequence, plate-fulcrums supporting each lever, a loading block for each lever, plate-fulcrums securing each loading block to its lever and a plate-fulcrum connecting one lever to the loading block of the other lever, the plate-fulcrums of one lever being at right angles to the plate-fulcrums of the other lever.

25. In a plate-fulcrum scale, a pair of first levers, a second lever placed at right angles to said levers, supporting fulcrums for all three levers, a bed carrying all three supporting fulcrums, an independent loading block for each lever and plate-fulcrums attaching each of the said blocks to its lever.

The foregoing specification signed at Stamford, Conn., this 27th day of December, 1915.

ALBERT HAMILTON EMERY.